(12) United States Patent
Roberts

(10) Patent No.: US 6,387,317 B1
(45) Date of Patent: May 14, 2002

(54) PROCESS FOR MANUFACTURING CLEAR SHAPED ARTICLES FROM POLYOLEFIN COMPOSITIONS

(75) Inventor: Timothy N. Roberts, Gibsonia, PA (US)

(73) Assignee: Aristech Chemical Corporation, Philadelphia, PA (US)

( * ) Notice: Subject to any disclaimer, the term of this patent is extended or adjusted under 35 U.S.C. 154(b) by 0 days.

(21) Appl. No.: 09/488,465

(22) Filed: Jan. 20, 2000

(51) Int. Cl.[7] ............................. B29C 51/00; C08K 5/09
(52) U.S. Cl. ..................... 264/544; 264/294; 264/320
(58) Field of Search ........................ 264/210.8, 216, 264/294, 320, 328.1, 523, 544, 564

(56) References Cited

U.S. PATENT DOCUMENTS

| 4,680,157 A | 7/1987 | Fujii et al. |
|---|---|---|
| 4,704,421 A | 11/1987 | Teskin |
| 5,300,549 A | 4/1994 | Ward et al. |
| 5,310,584 A | 5/1994 | Jacoby et al. |
| 5,319,012 A | 6/1994 | Ward et al. |

FOREIGN PATENT DOCUMENTS

EP 0172277 A1 2/1986

OTHER PUBLICATIONS

Unknown, "Unknown," Witco Polymer Additives technical information, Witco Corporation (Memphis, TN) (Undated).
Unknown, "Unknown," Witco Additives Product Guide, Witco Corporation Polymer Additives Group (Greenwich, CT) (Undated).

Primary Examiner—Leo B. Tentoni
(74) Attorney, Agent, or Firm—Robert A. Koons, Jr., Esq.; D. Mark Maloney, Esq.; Buchanan Ingersoll P.C.

(57) ABSTRACT

The present invention is a thermoforming process for manufacturing clear shaped articles such as deli containers, lids, cups and the like from blended, nucleated polyolefin compositions.

7 Claims, 1 Drawing Sheet

PROCESS FOR MANUFACTURING CLEAR SHAPED ARTICLES FROM POLYOLEFIN COMPOSITIONS

TECHNICAL FIELD

The present invention relates to a process for manufacturing clear shaped articles such as deli containers, lids, cups and the like from blended, nucleated polyolefin compositions.

BACKGROUND OF THE INVENTION

It is desirable to produce clear or transparent shaped articles such as deli containers, lids, cups and the like so that the material inside of the container can be viewed by potential customers before purchasing. Nucleated polypropylene provides for a high degree of clarity or transparency. However, shaped articles produced from nucleated polypropylene have a tendency to warp. This is particularly true for flat, shallow-draw parts such as lids. Therefore, shaped articles produced from nucleated polypropylene can be difficult to stack, for example for use in production lines. As a result, non-nucleated materials are used for producing such shaped articles. However, non-nucleated materials do not provide for a high degree of clarity or transparency.

There are many different techniques for forming shaped articles from polyolefin compositions. The techniques are sometimes referred to as primary processes and secondary processes. Primary processes include injection molding, compression molding, and casting; while secondary processes include melt spun fiber stretching, tubular film ("bubble") forming, blow molding and thermoforming.

The primary processes consist of forcing the polyolefin composition into a cavity and duplicating the cavity's shape. In the process of casting, the cavity may be filled by gravitational flow with a low viscosity liquid (reacting monomer or prepolymer) and, following polymerization, the liquid solidifies. In compression molding, a prepolymer solid mass is heated up or melted and forced to undergo a squeezing flow by hot mold surfaces that close to form a final shape. The prepolymer usually crosslinks and assumes the shape of the closed cavity permanently. In the injection molding process a polymer melt is forced through an orifice or gate into a closed cold mold where it solidifies under pressure in the shape of the mold cavity. The polymer is melted, mixed and injected from the injection unit of the machine. Tadmor, Zehev and Gogos, Costas G., *Principles of Polymer Processing*, John Wiley & Sons, Inc., New York, 1979, p. 584.

With respect to secondary shaping processes, melt spun fiber stretching, tubular ("bubble") forming and blow molding occur immediately after die forming. Blow molding involves using gas pressure inside an almost molten plastic tube to expand the plastic until it fills the cavity in the mold and solidifies against the walls of the mold. Thermoforming involves polymer sheets or films that have been extruded and solidified in a separate operation. Tadmor, Zehev and Gogos, Costas G., *Principles of Polymer Processing*, John Wiley & Sons, Inc., New York, 1979, p. 632.

Thermoforming is a generic term encompassing many techniques for producing useful shaped articles from flat sheets. Thermoforming is one of a family of processes that deal with the pressing or squeezing of pliable plastic into a final shape. Thermoforming is differentiated from the primary processes previously discussed as the primary processes involve melting of the polymer followed by solidification. For example, in injection molding, the initial resin state is pellet or powder and the shaping is done on the polymer as a liquid. Additionally, in compression molding pressures are substantially higher than those employed in traditional vacuum or low pressure thermoforming and the polymer is shaped as a liquid between matched metal molds.

Several polypropylene materials are currently used to make sheets which can be used in thermoforming. However, polypropylene is not inherently clear because of its semi-crystalline nature. While it is known to use certain additives to improve the clarity of polypropylene, certain of these known additives result in a high degree of warping.

U.S. Pat. Nos. 5,300,549 and 5,319,012 to Witco Corporation ("the Witco patents") disclose polyolefin compositions and method and compositions for their preparation. The compositions produced have improved clarity. Further, the Witco patents describe that articles may be manufactured from the compositions by casting, compression molding or injection molding; films may be made by flowing or by extrusion; filament, bars, tapes and the like may be obtained by extrusion. The Witco patents also teach that the invention is useful in all other processes involving melting of the polymer followed by solidification.

As mentioned, thermoforming is not a process in which the polypropylene is melted and resolidified. Thermoforming is an extremely versatile process which is used to make many types of shaped articles well known to many consumers. Therefore, there is a need to produce shaped articles such as deli containers, lids, cups and the like using thermoforming processes while achieving a high degree of clarity or transparency and a low tendency to warp.

SUMMARY OF THE INVENTION

The present invention provides a process for manufacturing a shaped product from a polyolefin composition nucleated with a combination of at least one dicarboxylic acid and at least one aliphatic monocarboxylic acid, for example oleic acid, stearic acid, behenic acid, myristic acid, abietic acid, lauric acid, linoleic acid, ricinoleic acid, dihydroxystearic acid, arachidic acid, eicosenoic acid, erucic acid, tetracosenoic acid, elaidic acid and mixtures thereof, comprising the steps of primarily processing the polyolefin composition by melting and resolidification of the polymer to form a starting material for a secondary processing step, and secondarily processing the starting material into a shaped article by a process that excludes melting and resolidification.

In one embodiment of the present invention, the step of secondarily processing includes the step of thermoforming.

Further, the present invention provides a process for manufacturing a shaped product from a starting material which consists of a blended nucleated polyolefin composition comprising forming the starting material into a shaped article with a process that excludes melting and resolidification of the starting material.

The present invention discloses a nucleation system that provides good clarity in thermoformed articles, but with a lower crystallization rate than the thermoforming grades of polyolefins currently in use. The present invention enables nucleated polypropylene, which is clear, to be formed into shaped articles by processes which do not involve melting and resolidification of the polypropylene. The resulting shaped articles retain the clarity of the starting material and exhibit low warpage. Those, and other advantages and benefits, will become apparent from the Detailed Description of the Invention hereinbelow.

BRIEF DESCRIPTION OF THE DRAWINGS

For the present invention to be easily understood and readily practiced, the present invention will be described, for purposes of illustration and not limitation, in conjunction with the following figures wherein.

DETAILED DESCRIPTION OF THE INVENTION

Figure 1:
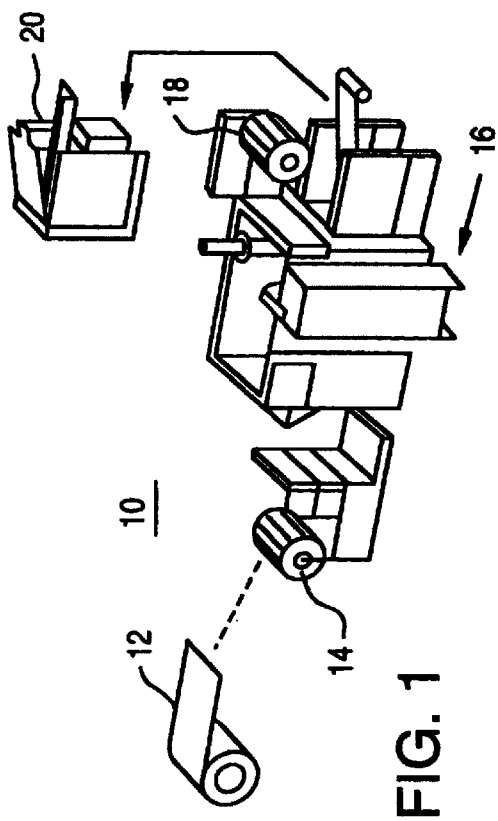
FIG. 1 illustrates a thermoforming device on which the method of the present invention may be practiced.

FIG. 1 illustrates a thermoforming device 10. The illustrated device 10 is disclosed for purposes of illustration. The reader will understand that the present invention may be carried out on many different types of thermoforming equipment such that the illustration of one particular type of device 10 should not be construed as limiting the present invention.

As shown in FIG. 1, a roll of polypropylene material 12 is supplied to a take-off roll 14. The material 12 is then fed from the takeoff roll 14 through the thermoformer and forming press 16 to form a shaped article. Tension is maintained on the rolled material 12 by a take-up roll 18. The shaped article may then be transferred to a trim die (not shown) where excess material is trimmed from the shaped article. The shaped articles are stacked and counted by a stacking/counting device 20.

Figure 2:
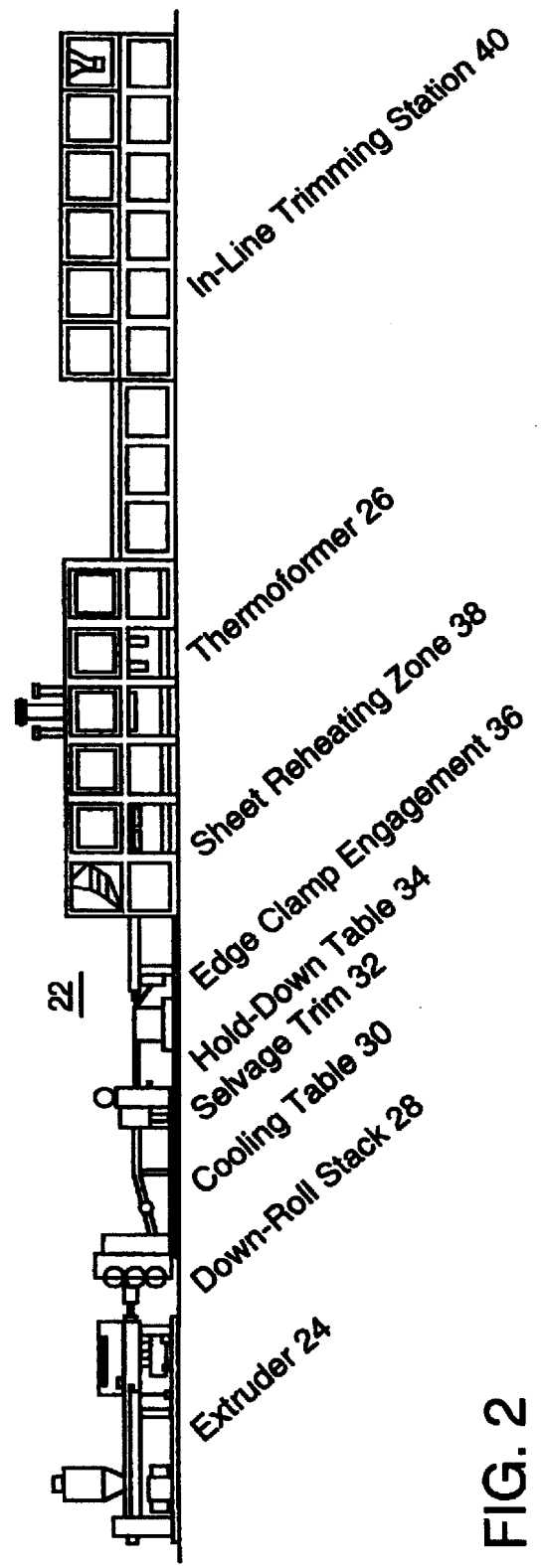
FIG. 2 illustrates an in-line sheet extrusion and thermoforming line on which the method of the present invention may be practiced.

FIG. 2 illustrates an in-line sheet extrusion and thermoforming line 22. As shown in FIG. 2, a sheet extruder 24 is placed in-line with a thermoformer 26, thus obviating problems associated with handling cut-sheet materials. The sheet is continuously fed from the extruder 24 to a down-roll stack 28 and cooling table 30 where the sheet is cooled. The sheet then travels to the salvage trim 32 where excess material trimmed from the sheet is salvaged for reuse. The sheet passes to a hold-down table 34 and edge clamp engagement 36. The sheet then travels to a reheating zone 38 where it is reheated and then travels to the thermoforming station 26 where it is formed into a shaped article. The shaped article then travels to the in-line trimming station 40 where excess material is trimmed from the shaped article. FIG. 2 is provided to illustrate that the present invention may be incorporated into various types of existing process lines in addition to being used in a stand-alone environment as shown in FIG. 1.

The roll of polypropylene materials 12 of FIG. 1 and the sheet of polypropylene material of FIG. 2 are two examples of a starting material for a secondary process. In preparing such starting materials, it is known to blend several types of materials, including polypropylene powder or pallets, additives, and nucleating agents. Witco Corporation located in Memphis Tenn. ("Witco"), markets a nucleating agent named MoldPRo 931 for molded polypropylene having improved clarity. The MoldPro 931 nucleating agent is believed to be comprised of a combination of at least one dicarboxylic acid and at least one aliphatic monocarboxylic acid selected from the group consisting of oleic acid, stearic acid, behenic acid, myristic acid, abietic acid, lauric acid, linoleic acid, ricinoleic acid, dihydroxystearic acid, arachidic acid, eicosenoic acid, erucic acid, tetracosenoic acid, elaidic acid and mixtures thereof. In the molding process, Witco asserts this nucleator provides its effect by interactions of the product with aluminum catalyst residues in the polymer (approximately 50 ppm of aluminum). Witco also asserts the need to use 2500–3750 ppm of the MoldPro 931 agent in the molding process.

To test the efficacy of the MoldPro 931 nucleating agent, tests were performed using as a starting material for a thermoforming process polypropylene having 200–1200 ppm MoldPro 931 nucleating agent. That starting material was then formed into cups and lids using a thermoforming process.

As shown in Table 1, tests were performed using varying amounts of the MoldPro 931 agent to determine the optimum level (of the MoldPro 931 agent) for producing 22-mil or 0.022 inch sheet samples on a 2-inch HPM sheet extrusion line.

TABLE 1.

Clarity of Sheet for Various Levels of MoldPro 931 Nucleating Agent

| Level of MoldPro 931 Nucleating Agent (ppm) | Haze of 22-mil Sheet (%) |
| --- | --- |
| 200 | 73.1 |
| 400 | 74.3 |
| 800 | 50.3 |
| 1200 | 49.1 |

Table 1 displays the clarity of the various sheets produced when differing amounts of the MoldPro 931 nucleating agent were used. The formulations used a 2 meltflow homopolymer polypropylene produced by Ziegler-Natta type catalyst. The formulations also included the following components in the additive package: Irganox 1010 (500 ppm) available from CIBA; Irganox 1076 (100 ppm) available from CIBA; Irganox 168 (1000 ppm) available from CIBA; and DHT4A (300 ppm) available from Mitsui USA. These components were chosen for convenience, and do not contribute to the effectiveness of MoldPro 931. As shown in Table 1, the haze percentage of the sheets decreased, that is, the clarity of the sheets increased as the amount of MoldPro 931 agent used in producing the sheets increased. For example, when the level of MoldPro 931 agent was 200 ppm, the haze % of the sheet was 73.1%. When the level of MoldPro 931 agent was 800 ppm, the haze % of the sheet was 50.3%.

TABLE 2

Data from OMV Thermoforming Line

| | Haze (%) 48 mil Sheet | Haze (%) 16-oz. Cup | Gloss 16-oz. Cup |
| --- | --- | --- | --- |
| 0 ppm MoldPro 931 agent | 78.6 | 85.3 | 15.9 |
| 400 ppm MoldPro 931 agent | 87.0 | 16.3 | 70.9 |
| 800 ppm MoldPro 931 agent | 68.8 | 8.4 | 97.7 |

As shown on Table 2, a 48-mil sheet was compared to 16-oz. cups produced using an OMV Thermoforming Line. The precursor sheets were thermoformed to form 16 oz. cups. That is, the precursor sheets were an intermediate product in that the sheets were fed into a thermoformer and formed into the 16 oz. cups. The formulations of Table 2 used the 2 meltflow homopolymer polypropylene and components in the additive package as identified in Table 1. As shown in Table 2, the haze % of both the sheets and the cups lowered as the amount of MoldPro 931 agent used was increased. Further, Table 2 also shows that the level of gloss on the 16-oz. cups increased as the amount of MoldPro 931 agent used increased.

The following table has data from testing on the OMV thermoforming line. This evaluation was performed on a 16-oz. deli cup. The precursor sheets were thermoformed to form 16 oz. cups. FT021N is available from Aristech Chemical Corporation and uses nucleating agent NA-11A, which is available from Amfine Chemicals. FF021B uses no nucleation and is available from Aristech Chemical Corporation. The formulations which used the MoldPro 931 agent also used a 2 meltflow homopolymer polypropylene produced by Ziegler-Natta type catalyst. The formulations using MoldPro 931 also included the following components in the additive package: Irganox 1010 (500 ppm) available from CIBA; Irganox 1076 (100 ppm) available from CIBA; Irgafos 168 (1000 ppm) available from CIBA; and DHT4A (300 ppm) available from Mitsui USA.

TABLE 3

Data from OMV Thermoforming Line, 16-oz. Deli Cup

|  | Haze (%) 48 mil Sheet | Haze (%) Cups | Gloss | Weight (g) | Top Load (lbs.) |
|---|---|---|---|---|---|
| FT021N (NA-11) | 39.5 | 8.2 | 98.4 | 11.1 | 51.7 |
| FF021B (non-nucl) | 78.6 | 85.3 | 15.9 | 10.9 | 40.0 |
| 400 ppm MoldPro 931 | 87.0 | 16.3 | 70.9 | 11.1 | N/a |
| 800 ppm MoldPro 931 | 68.8 | 8.4 | 97.7 | 11.2 | 50.6 |

As shown in Table 3, the haze value of the MoldPro 931 formulations, in particular the 800 ppm formulations, drastically reduce in going from the sheet to the cup. More specifically, the 800 ppm MoldPro 931 48 mil sheet had an average haze value of 68.8%, while the 800 ppm MoldPro 931 cup had an average haze value of 8.4%. This can be attributed to a number of factors, including but not limited to the fact that the sheet is approximately 4 times as thick as the cup, and also that the precursor sheet undergoes a stretching process as it is thermoformed into the cup.

Further, as shown in Table 3, none of the tested materials provided sheet as clear as FT021N. However, the MoldPro 931 agent formulations produced thermoformed cups with surprisingly good clarity and gloss. In fact, cups with 800 ppm MoldPro 931 agent had an average haze value of 8.4% vs. 8.2% for FT021N. This difference cannot be seen by the naked eye. This OMV data suggests that the MoldPro 931 agent might work well for any clear application. Tests were performed to determine whether the MoldPro 931 agent might work well for specifically producing clear lids.

As previously discussed, clear lids are difficult to process because nucleated polypropylene has a tendency to warp. As a result, OMV lid lines typically use non-nucleated materials, which do not provide good clarity.

An analysis of three different homopolymer material which are used in the formation of lids are given in the following table.

TABLE 4

Analysis of Thermoformed Lids

|  | Standard Non-Nucleated | Nucleated | (Nucleated and Non-Nucleated) 50/50 Blend |
|---|---|---|---|
| Haze (%): | 69.7 | 18.5 | 24.4 |
| Gloss: | 87.3 | 110.4 | 103.2 |
| Annealed DSC: |  |  |  |
| Tm (° C.) | 158.0 | 164.1 | 162.2 |
| Tc (° C.)* | 111.5 | 129.1 | 125.8 |
| % Cryst** | 56.8 | 62.7 | 60.4 |
| Isothermal DSC @ 130° C.: |  |  |  |

TABLE 4-continued

Analysis of Thermoformed Lids

|  | Standard Non-Nucleated | Nucleated | (Nucleated and Non-Nucleated) 50/50 Blend |
|---|---|---|---|
| Cryst Rate (mw/mg/min)*** | 0.0038 | 1.7415 | 1.3526 |
| Comments: | Poor clarity Flat | Very clear Too Warped | Clear Slightly Warped |

*Recrystallization temperature
**Weight % of crystalinity
***Rate of crystalinity As shown in Table 4, the nucleated lid has a low haze value, but too much post-mold warping. The high Tc and high crystallization rate of this material is believed to cause the bottom surface of the lid (which contacts the cold mold) to crystallize in the mold, whereas the top surface crystallizes later. The non-nucleated lid has a low crystallization rate and does not warp, but also has a very high haze value. The 50/50 blend provided a reasonable compromise between clarity and warping, but still had some tendency to warp.

To determine if a nucleation system using the MoldPro 931 agent would produce better results, formulations using the MoldPro 931 nucleating agent were studied. The following table has Differential Scanning Calorimetry ("DSC") data for five formulations evaluated on an OMV thermoforming line.

TABLE 5

Thermal Analysis of Potential Lid Materials

|  | Tm (° C.) | Tc (° C.) | Cryst (%) | Cryst Rate @ 130° C. (mw/mg/min) |
|---|---|---|---|---|
| FT021N (NA-11) | 161.7 | 128.7 | 62.7 | 2.3316 |
| FF021B (non-nucl) | 157.8 | 108.4 | 62.7 |  |
| 400 ppm MoldPro 931 | 160.6 | 123.2 | 63.1 |  |
| 800 ppm MoldPro 931 | 160.6 | 123.9 | 64.2 | 1.1530 |

FT021 N is available from Aristech Chemical Corporation and uses nucleating agent NA-11A, which is available from Amfine Chemicals. FF021B uses no nucleation and is available from Aristech Chemical Corporation. The formulations which used the MoldPro 931 agent also used a 2 meltflow homopolymer polypropylene produced by Ziegler-Natta type catalyst. The formulations using MoldPro 931 also included the following components in the additive package: Irganox 1010 (500 ppm) available from CIBA; Irganox 1076 (100 ppm) available from CIBA; Irgafos 168 (1000 ppm) available from CIBA; and DHT4A (300 ppm) available from Mitsui USA.

As shown in Table 5, the MoldPro 931 agent formulations looked promising because they had lower Tc and lower crystallization rates than even the 50/50 blend material shown in Table 4. Therefore the MoldPro 931 agent formulations were expected to exhibit less warpage than even the 50/50 blend material. This DSC data suggests that the MoldPro 931 agent should work well for producing clear lids with minimal warpage.

A trial was subsequently performed to produce lids on an OMV thermoforming line. The precursor sheets were thermoformed to form lids. The materials tested were a standard non-nucleated homopolymer polypropylene and a homopolymer polypropylene containing 800 ppm MoldPro 931. As the following table shows, the clarity of the lids was greatly improved by using MoldPro 931.

TABLE 6

6Data from OMV thermoforming Line, Lids

|  | % HAZE | GLOSS |
|---|---|---|
| Pre-cursor Sheet | | |
| Non-nucleated: | 66.2 | 11.5 |
| 800 ppm MoldPro 931: | 45.6 | 79.8 |
| Thermoformed Lids | | |
| Non-nucleated: | 71.3 | 87.2 |
| 800 ppm MoldPro 931: | 50.2 | 85.3 |

There were no problems with warping or stacking with either material. This assessment was easily made by visual inspection.

The present invention involves the discovery that polyolefins nucleated with the MoldPRo 931 agent may be subsequently shaped by thermoforming processes with improved clarity and no increase in warpage as compared to a non-nucleated material. It was also discovered that 50 ppm aluminum residue was not necessary and that levels of less than 1000 ppm of the MoldPro 931 agent are sufficient. The MoldPro 931 nucleation system provides for good clarity in the thermoformed articles, but with a lower crystallization rate than the thermoforming grades of polyolefins currently in use which leads to less warpage.

While the present invention has been disclosed in conjunction with preferred embodiments thereof, those of ordinary skill in the art will recognize that modifications and variations are possible. This disclosure and the following claims are intended to cover all such modifications and variations.

What is claimed is:

1. A process for manufacturing a shaped article from a polyolefin composition nucleated with a combination of at least one dicarboxylic acid and at least one aliphatic monocarboxylic acid selected from the group consisting of oleic acid, stearic acid, behenic acid, myristic acid, abietic acid, lauric acid, linoleic acid, ricinoleic acid, dihydroxystearic acid, arachidic acid, eicosenoic acid, erucic acid, tetracosenoic acid, elaidic acid and mixtures thereof, comprising the steps of:

primarily processing said polyolefin composition by melting and resolidification of the polymer to form a starting material for a secondary processing step; and secondarily processing said starting material into a shaped article by a process that excludes melting and resolidification.

2. The process as claimed in claim 1 wherein said step of secondarily processing includes the step of thermoforming.

3. The process as claimed in claim 1 wherein said combination of at least one dicarboxylic acid and at least one aliphatic monocarboxylic acid is from 200–1200 ppm.

4. A process for manufacturing a shaped article from a starting material which consists of a blended nucleated polyolefin composition comprising:

forming the starting material into a shaped article with a process that excludes melting and resolidification of the starting material.

5. The process as claimed in claim 4 wherein said forming step includes the step of thermoforming.

6. The process as claimed in claim 4 wherein said starting material consists essentially of an olefin polymer containing residual polymerization catalyst and an effective amount of a combination of at least one dicarboxylic acid and at least one aliphatic monocarboxylic acid selected from the group consisting of oleic acid, stearic acid, behenic acid, myristic acid, abietic acid, lauric acid, linoleic acid, ricinoleic acid, dihydroxystearic acid, arachidic acid, eicosenoic acid, erucic acid, tetracosenoic acid, elaidic acid and mixtures thereof wherein the weight ratio of aliphatic dicarboxylic acid to aliphatic monocarboxylic acid is about 1:1, wherein the starting material is formed by melting of the polymer followed by solidification.

7. The process as claimed in claim 4 wherein said effective amount of a combination of at least one dicarboxylic acid and at least one aliphatic monocarboxylic acid is from 200–1200 ppm.

* * * * *